(12) United States Patent
Fisher

(10) Patent No.: US 6,988,442 B2
(45) Date of Patent: Jan. 24, 2006

(54) AIR BRAKE DIAPHRAGMS WHICH RESIST PULL-OUT

(75) Inventor: Albert D. Fisher, Kansas City, MO (US)

(73) Assignee: Haldex Brake Corporation, Kansas City, MO (US)

( * ) Notice: Subject to any disclaimer, the term of this patent is extended or adjusted under 35 U.S.C. 154(b) by 8 days.

(21) Appl. No.: 10/323,342

(22) Filed: Dec. 19, 2002

(65) Prior Publication Data

US 2003/0116390 A1    Jun. 26, 2003

Related U.S. Application Data

(60) Provisional application No. 60/343,016, filed on Dec. 20, 2001.

(51) Int. Cl.
*F16J 3/02*     (2006.01)

(52) U.S. Cl. ..................................................... 92/98 R
(58) Field of Classification Search ................. 92/98 R
See application file for complete search history.

(56) References Cited

U.S. PATENT DOCUMENTS

| | | | |
|---|---|---|---|
| 1,005,270 A | * | 10/1911 | Milburn ...................... 92/98 R |
| 2,773,511 A | * | 12/1956 | Mercier ....................... 92/98 R |
| 3,113,592 A | * | 12/1963 | Mercier ....................... 92/98 R |
| 3,842,716 A | | 10/1974 | Swander, Jr. .................... 92/63 |
| 3,872,777 A | | 3/1975 | Mastis ........................... 92/101 |
| 3,911,796 A | | 10/1975 | Hull, et al. ..................... 92/101 |
| 5,115,719 A | | 5/1992 | Endo ............................ 91/376 |
| 5,507,217 A | | 4/1996 | Plantan .......................... 92/63 |
| 5,765,466 A | | 6/1998 | Plantan et al. .................. 92/98 |
| 5,992,297 A | | 11/1999 | Plantan et al. .................. 92/98 |
| 6,131,501 A | | 10/2000 | Smith ............................ 92/98 |
| 6,212,996 B1 | | 4/2001 | Savel et al. .................... 92/101 |

* cited by examiner

*Primary Examiner*—F. Daniel Lopez
(74) *Attorney, Agent, or Firm*—St. Onge Steward Johnston & Reens LLC

(57) ABSTRACT

A brake actuator includes a flange case having a radially outwardly extending annular flange, a head having a radially outwardly extending annular flange, and a diaphragm having a widened outer periphery sandwiched between the annular flange of the flange case and the annular flange of the head. The diaphragm includes a reinforcing member embedded in or attached to an outer surface of the widened outer periphery thereof. The reinforcing member is formed of a material which is more resistant to deformation than a material of which the diaphragm is formed so as to inhibit the widened outer periphery of the diaphragm from pulling out from between the annular flange of the flange case and the annular flange of the head.

21 Claims, 3 Drawing Sheets

ABOUT AIR BRAKE DIAPHRAGMS WHICH RESIST PULL-OUT

AIR BRAKE DIAPHRAGMS WHICH RESIST PULL-OUT

RELATED APPLICATIONS

This patent application claims the benefit of, under Title 35, United States Code, Section 119(e), U.S. Provisional Patent Application No. 60/343,016, filed Dec. 20, 2001.

FIELD OF THE INVENTION

The present invention relates generally to fluid-operated brake actuators, such as air brake actuators, and more specifically to diaphragms for use in such actuators.

BACKGROUND OF THE INVENTION

Fluid-operated braking systems such as air brake systems have long been used to control the movement of motor vehicles in a safe and effective manner. In particular, air brakes are commonly used on commercial vehicles, such as trucks which typically have large gross vehicle weights. The considerable inertial mass of these heavy-duty vehicles in combination with the high speeds at which they travel require a braking system which responds rapidly with substantial braking power. One system component which is instrumental in the operation of air brake systems is the brake actuator. The brake actuator provides the force necessary when braking a vehicle.

Commercial air brake actuators can actuate the normal surface brakes as well as parking/emergency brakes. The brake actuators, also known as spring brakes, typically have a network of air chambers defined by one or more diaphragms and/or pistons and a plurality of springs which operate to provide the appropriate braking action in response to inputs by the vehicle driver. In the event an air braking system loses pressure, the brake actuator automatically engages the vehicle brakes.

In brake actuators of this type, the diaphragms are typically flexible, cup-shaped and have an outer radial rim which is received and compressed between flange portions of a housing and cover. Such diaphragms are generally formed of a rubber material with a fibrous reinforcement disposed therein. U.S. Pat. Nos. 3,842,716, 3,872,777, 5,115,719, 6,131,501 and 6,212,996 each disclose examples of diaphragms for use in brake actuators having various configurations.

One problem with diaphragm-type brake actuators is that an adequate seal must be provided at an outer peripheral surface of the diaphragm, which is squeezed between the housings. This seal has sometimes been somewhat difficult to obtain since the diaphragm may be positioned off center between the housings during assembly. Thus, should the diaphragm be positioned off center when the housings are secured together, an adequate seal may not be provided. Numerous attempts have been made to obviate this problem. For example, U.S. Pat. No. 5,992,297 discloses a diaphragm having an outer wedge-shaped edge portion with flats adjacent thereto. The flats are supposed to help facilitate assembly of the brake actuator. U.S. Pat. Nos. 5,765,466 and 5,507,217 disclose diaphragms which have particular configurations about their peripheries. These configurations are supposed to facilitate centering and aid in maintaining proper alignment during assembly.

Another problem associated with diaphragm-type brake actuators is that after repeated use, the diaphragms may tend to pull out of the mechanically clamped sealing area of the actuator assembly, thereby causing leakage and possibly rendering the brake actuator inoperative. As this phenomenon can occur even if the diaphragm was properly aligned and seated during assembly, the above-referenced patents do not adequately address this problem.

U.S. Pat. No. 3,911,796 discloses a diaphragm having a plurality of protuberances thereon which are supposed to help the diaphragm resist abrasion and wear, and thus inhibit leaks from being created. However, this patent discloses no design which would adequately help prevent the diaphragm from pulling out of its sealing area.

What is desired, therefore, is a diaphragm-type brake actuator which is not prone to leaking or developing leaks and which incorporates a diaphragm which resists pull out from its sealing area even after extended use.

SUMMARY OF THE INVENTION

Accordingly, it is an object of the present invention to provide a diaphragm-type brake actuator which is not prone to leaking or developing leaks.

Another object of the present invention is to provide a diaphragm-type brake actuator having the above characteristics and which incorporates a diaphragm which resists pull out from its sealing area even after extended use.

These and other objects of the present invention are achieved by provision of a brake actuator including a flange case having a radially outwardly extending annular flange, a head having a radially outwardly extending annular flange, and a diaphragm having a widened outer periphery sandwiched between the annular flange of the flange case and the annular flange of the head. The diaphragm includes a reinforcing member embedded in or attached to an outer surface of the widened outer periphery thereof. The reinforcing member is formed of a material which is more resistant to deformation than a material of which the diaphragm is formed so as to inhibit the widened outer periphery of the diaphragm from pulling out from between the annular flange of the flange case and the annular flange of the head.

The brake actuator may further include a securing mechanism clamping the annular flange of the flange case and the annular flange of the head together with the widened outer periphery sandwiched therebetween. In certain embodiments, the reinforcing member comprises a continuous reinforcing member. In other embodiments, the reinforcing member comprises a reinforcing member composed of a plurality of discrete segments. In some embodiments, the reinforcing member is formed from a material selected from the group consisting of a hard rubber compound, a metal, a plastic, a heavy fibrous material, or combinations of these.

In certain embodiments, the reinforcing member comprises a ring of material inserted into the widened outer periphery of the diaphragm. In some of these embodiments, the widened outer periphery of the diaphragm includes a channel in an outer surface thereof and the ring is disposed in the channel. In other of these embodiments, the ring is embedded within the widened outer periphery of the diaphragm during formation thereof.

In certain embodiments, the reinforcing member comprises a ring of material bonded to an outside diameter of the widened outer periphery of the diaphragm. In some of these embodiments, the ring is bonded to the outside diameter of the widened outer periphery of the diaphragm with an adhesive.

In certain embodiments, the reinforcing member comprises a first portion adjacent to an outside diameter of the widened outer periphery of the diaphragm and a second portion disposed between the widened outer periphery of the diaphragm and the outwardly extending annular flange of the flange case. In some of these embodiments, the reinforcing member is attached to the widened outer periphery of the diaphragm by a plurality of gripping features penetrating into the widened outer periphery of the diaphragm. These gripping features may, for example, be lanced, pressed or molded into the second portion of the reinforcing member.

In another respect, the present invention relates to a diaphragm adapted to be sandwiched between annular flanges on two housing components of a brake actuator. The diaphragm includes a widened outer periphery and a reinforcing member embedded in or attached to an outer surface of the widened outer periphery. The reinforcing member is formed of a material which is more resistant to deformation than a material of which the widened outer periphery is formed so as to inhibit the widened outer periphery from pulling out from between the annular flanges of the housing components.

The invention and its particular features and advantages will become more apparent from the following detailed description considered with reference to the accompanying drawings.

DETAILED DESCRIPTION OF EXEMPLARY EMBODIMENTS OF THE INVENTION

Figure 1:
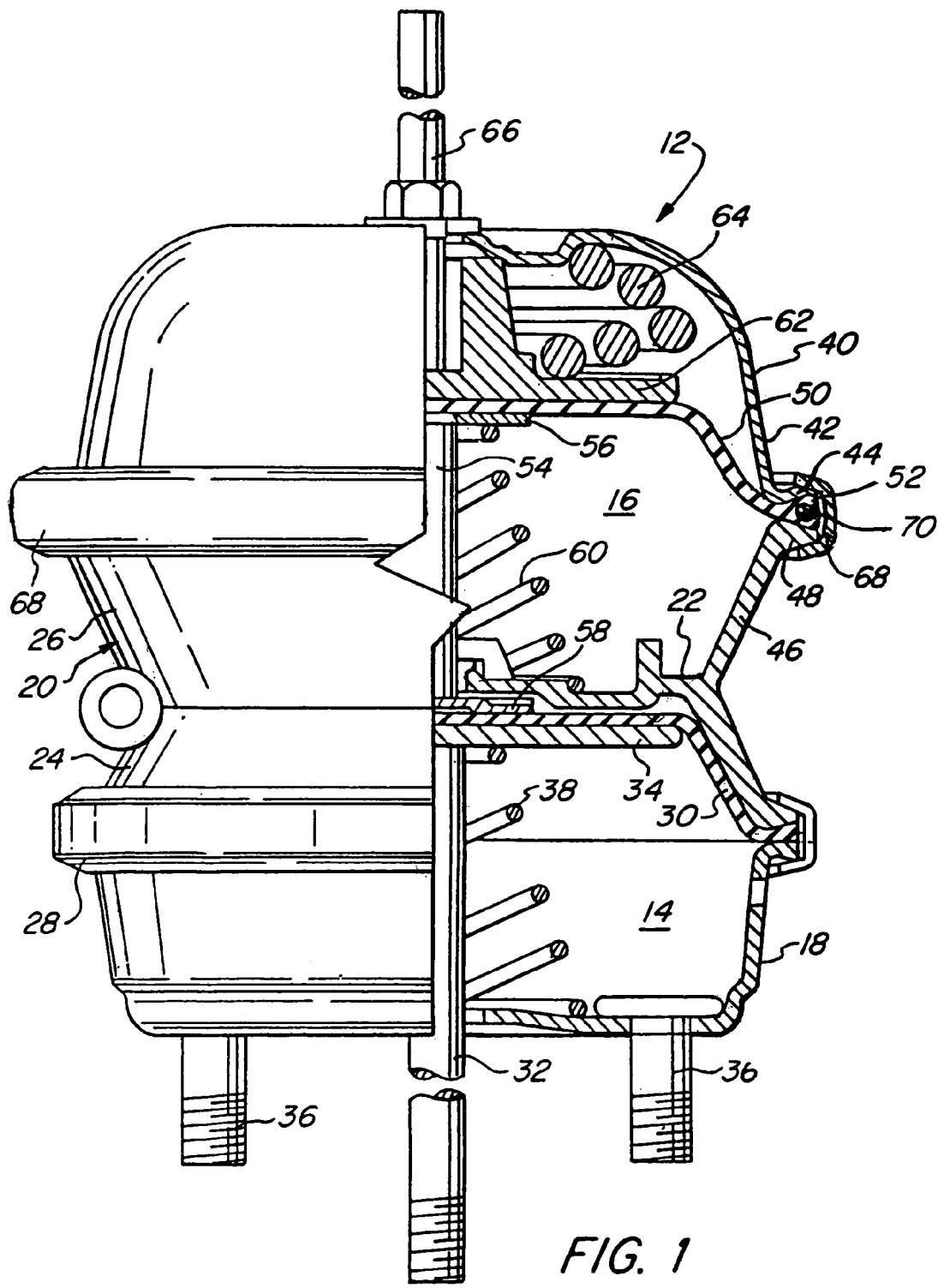
FIG. 1 is a side elevation view, partially in section, of a brake actuator in accordance with one exemplary embodiment of the present invention.

Referring first to FIG. 1, a brake actuator according to the present invention is shown. The embodiment shown is an air-operated dual diaphragm spring brake actuator, which includes a housing 12 containing a service chamber 14 and a spring chamber 16 in tandem. The service chamber 14 is defined by a cup-shaped service housing 18 and a flange case 20. The flange case 20 is double cup-shaped and includes a divider wall 22 separating a service side 24 of the flange case 20 from a spring side 26 of the flange case 20. The service housing 18 is secured to the service side 24 of the flange case 20 using a conventional bolted clamp 28, or any other of numerous means as are known in the art. An elastomeric service brake diaphragm 30 is clamped in fluid tight engagement between the service housing 18 and the service side 24 of the flange case 20. Although not shown, an aperture is provided in the flange case 20 for providing communication between a source of compressed air and a portion of the service chamber 14 between the diaphragm 30 and the divider wall 22 of the flange case 20, also as is known in the art.

A service push rod 32 extends through the service housing 18 into the service chamber 14, and mounts a service push rod plate 34 at an inner end thereof. The service push rod 32 has a threaded outer end for connection to the braking system of a vehicle. In addition, bolts 36 are provided for mounting the service housing 18 to the vehicle. A service return spring 38 extends between the service housing 18 and the service push rod plate 34 to bias the service push rod plate 34 and thus the service push rod 32 into the service chamber 14 to release the brake. The spring biased service push rod plate 34 normally forces the service brake diaphragm 30 against the divider wall 22 of the flange case 20 in the brake release position.

When air pressure is supplied through the aperture in the service side 24 of the flange case 20 as, for example, when the brakes are applied by a vehicle operator, compressed air is introduced between the service brake diaphragm 30 and the divider wall 22, thereby forcing the diaphragm toward the service housing 18. In this manner, the service push rod 32 is extended outwardly of the service chamber 14 to apply braking pressure to the vehicle brakes in a conventional fashion.

The spring chamber 16 is defined by the spring side 26 of the flange case 20 and a head 40. The head 40 includes a sidewall 42, which is preferably cylindrical or frustoconical, having an annular flange 44 outwardly extending therefrom. Similarly, spring side 26 of flange case 20 includes a sidewall 46, which is preferably cylindrical or frustoconical, having an annular flange 48 outwardly extending therefrom. Head 40 is secured to the spring side 26 of the flange case 20 by a clamp 68, or any other of numerous mechanisms as are known in the art. Preferably, the mechanism by which head 40 is secured to the flange case 20 is tamper resistant, and may comprise a mechanism such as is disclosed in U.S. Patent Publication No. U.S.2002-0148350-A1, U.S. Patent Publication No. US-2002-0148351-A1, U.S. Pat. No. 6,405,636-B1, or any of numerous other patents directed to such a mechanism.

A spring diaphragm 50 has a periphery 52 clamped in a fluid tight manner between annular flange 44 of head 40 and annular flange 48 of the spring side 26 of the flange case 20. Periphery 52 includes a reinforcing member 70 embedded therein on attached thereon, as more fully described below.

An aperture (not shown) is provided within the spring side 26 of the flange case 20 to connect a portion of the spring chamber 16 between the dividing wall 22 and the spring diaphragm 50 with a source of compressed air (not shown). A flange case push rod 54 extends between the spring chamber 16 and the service chamber 14, and has a first reaction plate 56 rigidly mounted to one end, and a second reaction plate 58 mounted to the other end thereof. A return spring 60 is mounted within the spring chamber 16 between the divider wall 22 and the first reaction plate 56 to bias the flange case push rod 54 into the release position.

A pressure plate 62 bears against the spring diaphragm 50, and a power spring 64 is positioned between the pressure plate 62 and the head 40 to bias the pressure plate 62 and the push rods 32, 54 to a brake actuating position. The flange case 20 is typically cast aluminum and the head 40 is typically stamped or spun low-carbon steel. The actuator 10 may include a release tool 66 that extends within the head 40 for mechanically drawing the pressure plate 62 against the head 40 such that the power spring 64 assumes a retracted or "caged" position. The release tool 66 can thus mechanically release the brake after a loss of power or air pressure, as is known in the art.

In operation, air pressure is continually supplied to the spring chamber 16 through the aperture (not shown) to maintain the spring diaphragm 50 in a position to compress the power spring 64. In this position, the service push rod 32 normally is operated as described above by selective pressurization of air into the service chamber 14. However, in the event of failure of the air pressure system, the pressure in the spring chamber 16 will be decreased so that the service return spring 38 and flange case return spring 60 would no longer be able to overcome the pressure of the much larger and stronger power spring 64. Thus, the pressure plate 62 forces the spring diaphragm 50 and thus the flange case push rod 54 outwardly, thereby also forcing the service push rod 32 outwardly to apply braking pressure to the brakes.

Figure 2:
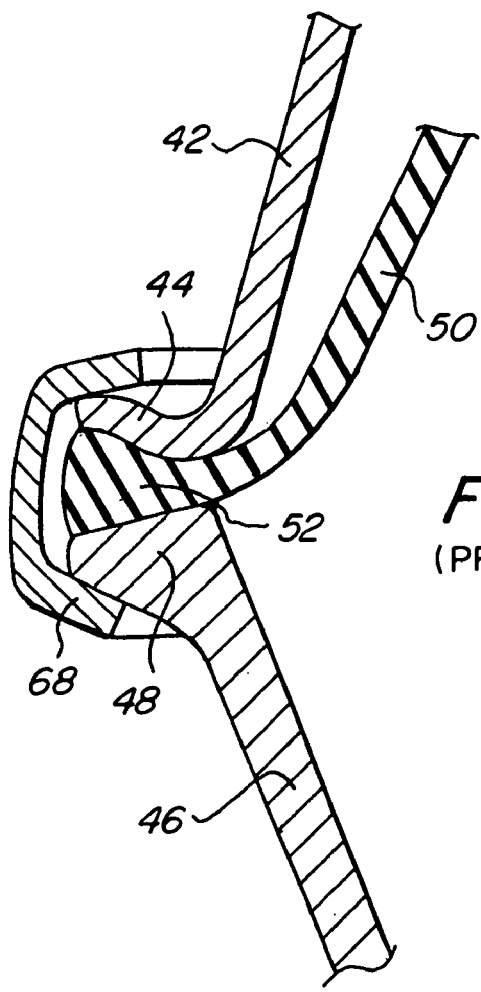
FIG. 2 is an enlarged side sectional view of a portion of a brake actuator in accordance with the prior art.

Referring now to FIG. 2, an enlarged side sectional view of a portion of a brake actuator in accordance with the prior art is shown. The brake actuator includes a diaphragm 50 having a periphery 52 clamped in a fluid tight manner between annular flange 44 of head 40 and annular flange 48 of the spring side 26 of the flange case 20. Periphery 52 is of a standard known configuration.

Figure 3:
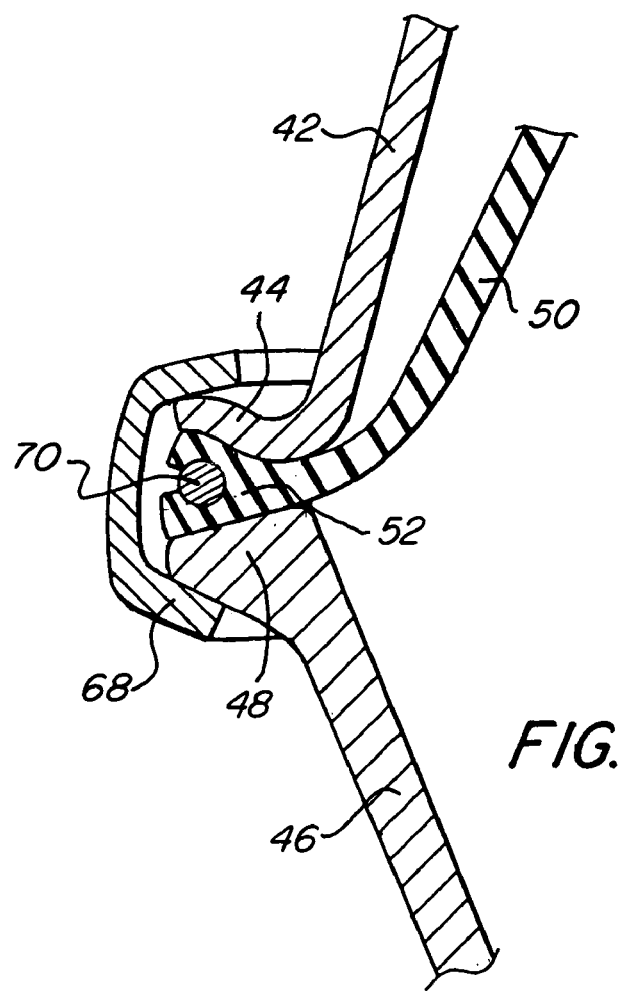
FIG. 3 is an enlarged side sectional view of a portion the embodiment of the present invention shown in FIG. 1.

Referring now to FIG. 3, an enlarged side sectional view of a portion of the brake actuator of FIG. 1 is shown. The brake actuator includes a diaphragm 50 having a periphery 52 clamped in a fluid tight manner between annular flange 44 of head 40 and annular flange 48 of the spring side 26 of the flange case 20. Periphery 52 includes a reinforcing member 70 embedded therein. In this embodiment, reinforcing member comprises a ring of material inserted into the periphery 52 of the diaphragm 50. The inserted material could be a harder rubber compound, a metal wire or cable, a plastic ring, a heavy fibrous cord or any other material that could replace a portion of the soft rubber in the periphery 52 with a less compressible bulk. The reinforcing member 70 could be a continuous ring or could be composed of one or more segments around the circumference of the periphery 52 of the diaphragm 50, and could be inserted into a channel in periphery 52 or could be molded therein during creation of diaphragm 50.

This embodiment of reinforcing member 70 allows for the surface of the rubber periphery 52 to be soft rubber to encourage a good seal and adds a relatively less flexible or non-compressible volume to the periphery 52. This will strongly resist any forces acting to pull the periphery 52 the gap between annular flange 44 of head 40 and annular flange 48 of the spring side 26 of the flange case 20. This embodiment would require minimal or no modification to be produced in a conventional diaphragm molding tool.

Figure 4:
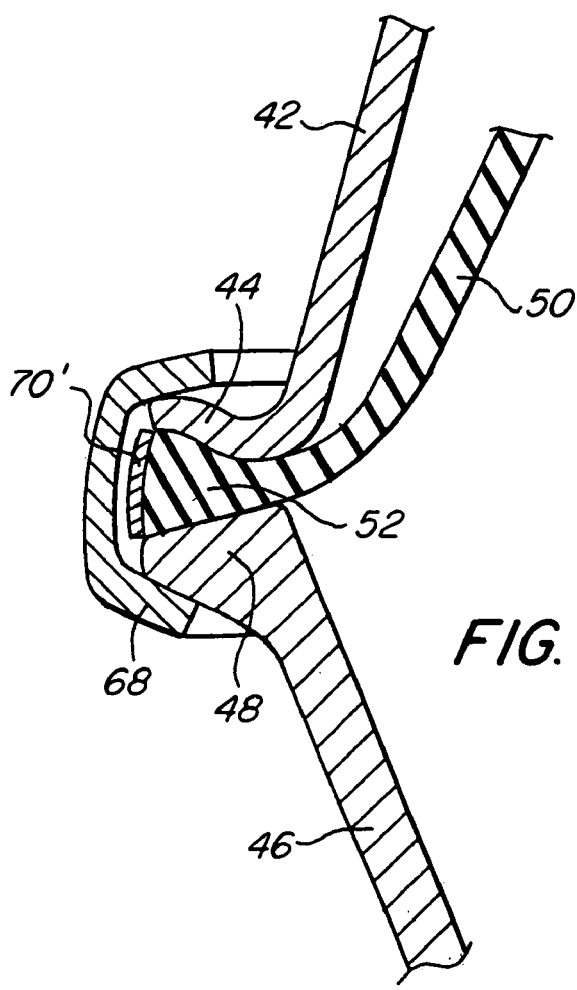
FIG. 4 is an enlarged side sectional view of a portion of a brake actuator in accordance with another exemplary embodiment of the present invention.

Referring now to FIG. 4, an enlarged side sectional view of a brake actuator in accordance with another embodiment of the present invention is shown. In this embodiment, reinforcing member 70' comprises a rigid or semi-rigid ring of material bonded to the outside diameter of the periphery 52 of a typical rubber diaphragm 50. The ring could be continuous or it may have one or more breaks along the outside diameter of the diaphragm 50. This embodiment would not allow the periphery 52 to pull loose from the assembly and could also be made to function as a locating device or pilot to help center the diaphragm 50 at the assembly operation. The ring or ring segments could be bonded at the time of molding and curing of the diaphragm 50 or bonded to a finished molded part with an appropriate adhesive. This embodiment would require minimal or no modification to be produced in a conventional diaphragm molding tool.

Figure 5:
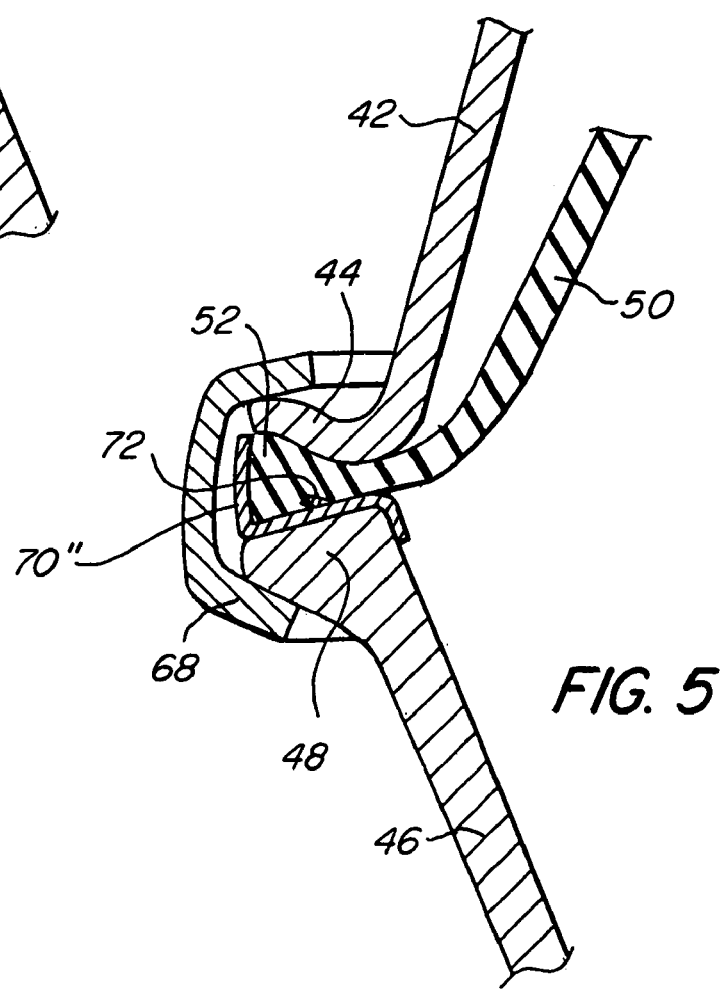
FIG. 5 is an enlarged side sectional view of a portion of a brake actuator in accordance with another exemplary embodiment of the present invention.

Referring now to FIG. 5, an enlarged side sectional view of a brake actuator in accordance with another embodiment of the present invention is shown. In this embodiment, reinforcing member 70" comprises a separate rigid or semi-rigid part to grip the periphery 52 of the diaphragm 50 and aid in locating the rubber diaphragm 50 at assembly. This separate part could be made of metal or plastic with lanced, pressed or molded gripping features 72 to contact and penetrate into the periphery 52 on the non-pressure side thereof. The reinforcing member 70" would also form a locator to guide the outside diameter of the periphery 52 and the lip of the actuator housing on the non-pressure side of the assembly. The rubber surface of the periphery 52 would be used to contact and effectively seal against the pressure side housing (i.e., annular flange 44 of head 40) of the actuator assembly with the gripping features 72 securing the reinforcing member 70" to the opposite (non-pressure) side of periphery 52. This separate locating/gripping reinforcing member 70" would allow the use of a conventional air brake actuator diaphragm in the actuator assembly but may require a wider clamp 68.

The present invention, therefore, provides a diaphragm-type brake actuator which is not prone to leaking or developing leaks and which incorporates a diaphragm which resists pull out from its sealing area even after extended use.

Although the invention has been described with reference to a particular arrangement of parts, features and the like, these are not intended to exhaust all possible arrangements or features, and indeed many other modifications and variations will be ascertainable to those of skill in the art. For example, although the embodiments discussed herein incorporate a reinforcing member in the diaphragm of the spring chamber of a dual chamber actuator, it should be understood by those skilled in the art that the reinforcing member could instead or in addition be incorporated into the service chamber and/or could be incorporated into a single chamber actuator. Many other obvious variants are also contemplated.

What is claimed is:

1. A brake actuator comprising:
   a service chamber and a spring chamber disposed in tandem, said spring chamber being defined by a flange case having a radially outwardly extending annular flange and a head having a radially outwardly extending annular flange;
   wherein the annular flange of said flange case and the annular flange of said head define a widened annular opening having a width and a narrowed passage having a width smaller than the width of the widened annular opening;
   a diaphragm having a widened outer periphery with a width greater than the width of the narrowed passage, the widened outer periphery of said diaphragm being sandwiched between the annular flange of said flange case and the annular flange of said head and disposed within the widened annular opening, said diaphragm comprising a reinforcing member embedded in or attached to an outer surface of the widened outer periphery thereof radially outwardly of the narrowed passage, the reinforcing member comprising a ring having a generally circular cross-section and being formed of a material which is more resistant to deformation than a material of which said diaphragm is formed so as to inhibit the widened outer periphery of said diaphragm from pulling radially inwardly through the narrowed passage between the annular flange of said flange case and the annular flange of said head; and
   wherein said reinforcing member comprises a reinforcing member composed of a plurality of discrete segments.

2. A diaphragm adapted to be sandwiched between an annular flange of a flange case and an annular flange of a head, which together define a widened annular opening having a width and a narrowed passage having a width smaller than the width of the widened annular opening, the flange case and the head defining a spring chamber, which together in tandem with a service chamber, form a brake actuator, said diaphragm comprising:

a widened outer periphery sandwiched between the annular flange of said flange case and the annular flange of said head and disposed within the widened annular opening, and having a width greater than the width of the narrow passage;

a reinforcing member embedded in or attached to an outer surface of said widened outer periphery radially outwardly of the narrowed passage, the reinforcing member comprising a ring having a generally circular cross-section and being formed of a material which is more resistant to deformation than a material of which said widened outer periphery is formed so as to inhibit said widened outer periphery from pulling radially inwardly through the narrow passage between the annular flange of said flange case and the annular flange of said head; and wherein said reinforcing member comprises a reinforcing member composed of a plurality of discrete segments.

3. A brake actuator comprising:

a flange case having a radially outwardly extending annular flange;

a head having a radially outwardly extending annular flange; and a diaphragm having a widened outer periphery, the widened outer periphery of said diaphragm being sandwiched between the annular flange of said flange case and the annular flange of said head, said diaphragm comprising a reinforcing member embedded in or attached to an outer surface of the widened outer periphery thereof, wherein said reinforcing member comprises a reinforcing member composed of a plurality of discrete segments and formed of a material which is more resistant to deformation than a material of which said diaphragm is formed so as to inhibit the widened outer periphery of said diaphragm from pulling out from between the annular flange of said flange case and the annular flange of said head.

4. The brake actuator of claim 3 further comprising a securing mechanism clamping the annular flange of said flange case and the annular flange of said head together with the widened outer periphery sandwiched therebetween.

5. The brake actuator of claim 3 wherein said reinforcing member is formed from a material selected from the group consisting of a hard rubber compound, a metal, a plastic, a heavy fibrous material, or combinations of these.

6. The brake actuator of claim 3 wherein said reinforcing member comprises a ring of material inserted into the widened outer periphery of said diaphragm.

7. The brake actuator of claim 3 wherein the widened outer periphery of said diaphragm includes a channel in the outer surface thereof and wherein said reinforcing member is disposed in the channel.

8. The brake actuator of claim 3 wherein said reinforcing member is embedded within the widened outer periphery of said diaphragm during formation thereof.

9. The brake actuator of claim 3 wherein said reinforcing member comprises a ring of material bonded to an outside diameter of the widened outer periphery of said diaphragm.

10. The brake actuator of claim 9 wherein said ring is bonded to the outside diameter of the widened outer periphery of said diaphragm with an adhesive.

11. The brake actuator of claim 9 wherein said reinforcing member is attached to the widened outer periphery of said diaphragm by a plurality of gripping features penetrating into the widened outer periphery of said diaphragm.

12. The brake actuator of claim 11 wherein the gripping features are lanced, pressed or molded into the second portion of said reinforcing member.

13. A diaphragm adapted to be sandwiched between annular flanges on two housing components of a brake actuator, said diaphragm comprising:

a widened outer periphery;

a reinforcing member embedded in or attached to an outer surface of said widened outer periphery, wherein said reinforcing member comprises a reinforcing member composed of a plurality of discrete segments and formed of a material which is more resistant to deformation than a material of which said widened outer periphery is formed so as to inhibit said widened outer periphery from pulling out from between the annular flanges of the housing components.

14. The brake actuator of claim 13 wherein said reinforcing member is formed from a material selected from the group consisting of a hard rubber compound, a metal, a plastic, a heavy fibrous material, or combinations of these.

15. The brake actuator of claim 13 wherein said reinforcing member comprises a ring of material inserted into the widened outer periphery of said diaphragm.

16. The brake actuator of claim 13 wherein the widened outer periphery of said diaphragm includes a channel in an outer surface thereof and wherein said reinforcing member is disposed in the channel.

17. The brake actuator of claim 13 wherein said reinforcing member is embedded within the widened outer periphery of said diaphragm during formation thereof.

18. The brake actuator of claim 13 wherein said reinforcing member comprises a ring of material bonded to an outside diameter of the widened outer periphery of said diaphragm.

19. The brake actuator of claim 18 wherein said ring is bonded to the outside diameter of the widened outer periphery of said diaphragm with an adhesive.

20. The brake actuator of claim 18 wherein said reinforcing member is attached to the widened outer periphery of said diaphragm by a plurality of gripping features penetrating into the widened outer periphery of said diaphragm.

21. The brake actuator of claim 20 wherein the gripping features are lanced, pressed or molded into the second portion of said reinforcing member.

* * * * *